July 12, 1966 B. W. HAZELTON ETAL 3,260,089
METHOD AND APPARATUS FOR FORMING A PERIPHERAL
GROOVE IN A TUBULAR BODY
Filed Feb. 17, 1964 9 Sheets-Sheet 1

INVENTORS,
BURTON W. HAZELTON
BY FRED R. KAUTEN

Gravely, Lieder & Woodruff
ATTORNEYS.

July 12, 1966 B. W. HAZELTON ETAL 3,260,089
METHOD AND APPARATUS FOR FORMING A PERIPHERAL
GROOVE IN A TUBULAR BODY
Filed Feb. 17, 1964 9 Sheets-Sheet 3

INVENTORS.
BURTON W. HAZELTON
FRED R. KAUTEN
BY
Gravely, Lieder & Woodruff
ATTORNEYS.

INVENTORS.
BURTON W. HAZELTON
FRED R. KAUTEN
BY
Gravely Lieder & Woodruff
ATTORNEYS, July 12, 1966

B. W. HAZELTON ETAL 3,260,089

METHOD AND APPARATUS FOR FORMING A PERIPHERAL
GROOVE IN A TUBULAR BODY

Filed Feb. 17, 1964

INVENTORS.
BURTON W. HAZELTON
FRED R. KAUTEN
BY
Gravely, Lieder & Woodruff
ATTORNEYS.

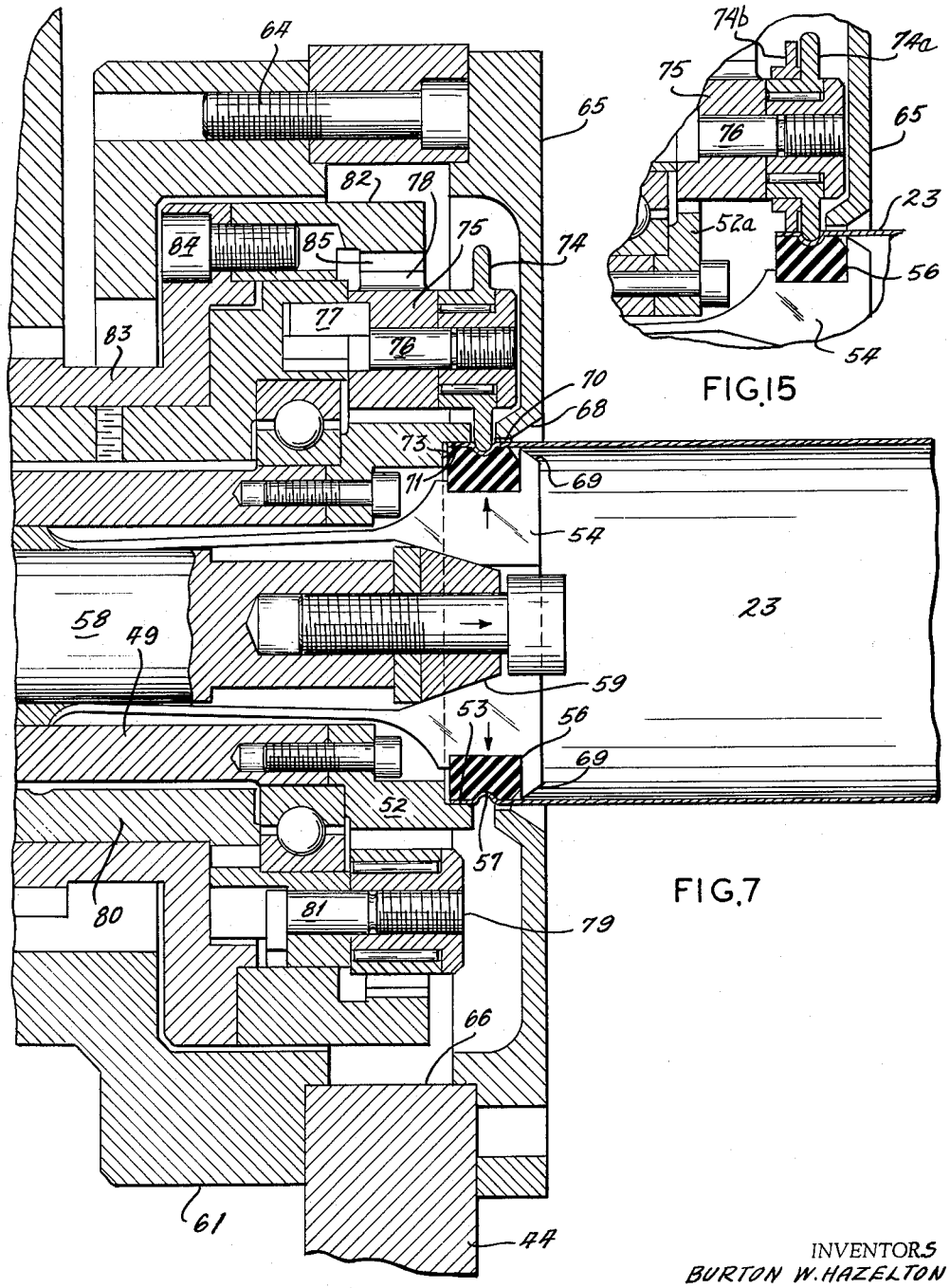

July 12, 1966  B. W. HAZELTON ETAL  3,260,089
METHOD AND APPARATUS FOR FORMING A PERIPHERAL
GROOVE IN A TUBULAR BODY
Filed Feb. 17, 1964  9 Sheets-Sheet 8

INVENTORS.
BURTON W. HAZELTON
FRED R. KAUTEN
BY
*Gravely, Lieder & Woodruff*
ATTORNEYS.

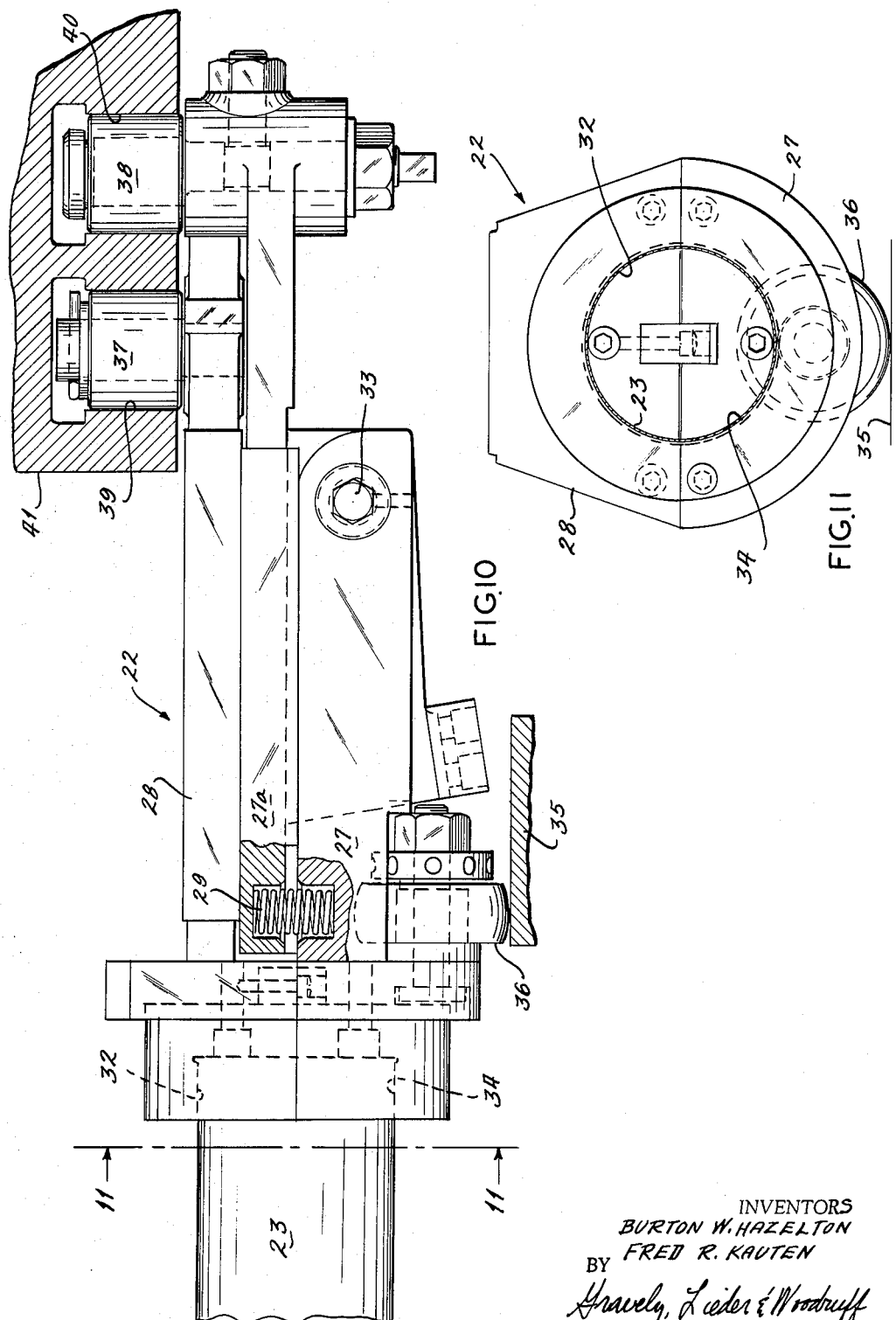

United States Patent Office 3,260,089
Patented July 12, 1966

3,260,089
METHOD AND APPARATUS FOR FORMING A PERIPHERAL GROOVE IN A TUBULAR BODY
Burton W. Hazelton, Kirkwood, Mo., and Fred R. Kauten, Greenville, Ill., assignors to Pet Milk Company, St. Louis, Mo., a corporation of Delaware
Filed Feb. 17, 1964, Ser. No. 345,219
9 Claims. (Cl. 72—117)

The present invention comprises a machine for forming a peripheral groove in a tubular body, and specifically relates to a machine which can be positioned in a conventional can assembly line to form an inwardly directed circumferential groove adjacent to one end of a hollow tubular can body.

One of the housewife's principal objections to conventional evaporated milk cans involves the problem of opening the cans. As distinguished from a sanitary type can which has a bead around the end which may be used to open the cans with a conventional beer type can opener, a conventional evaporated milk can has a soldered, substantially beadless top and special pointed tools or can openers must be used to open the container.

To overcome this objection, it is proposed to provide an evaporated milk can with a circumferential groove adjacent to one end which may be grasped by a conventional beer type can opener to open the can. To this end, the principal object of the present invention is to provide a high speed, reliable, machine for forming a circumferential inwardly directed groove in the can body adjacent to one end.

Most milk processing companies have a large investment in can making and canning equipment, and another principal object of the present invention is to provide a can grooving machine which can be placed in a conventional can line as an additional piece of equipment and used without large expenditures of money for modification of the existing equipment.

Another object of the present invention is to provide a method of forming a circumferential groove adjacent to one end of a hollow tubular body.

A further object of the present invention is to provide a machine for forming a groove in an evaporated milk can body prior to placing the lid on the can and after forming the sheet metal into a hollow tubular article.

Still another object of the present invention is to provide a machine for forming a groove in a can body adjacent to one end, said machine including an expansible ring for supporting the end of a can body and a rotating groove-forming head which acts to force the can wall inwardly against the mandrel.

Another object is to provide a structure for rapidly forming a groove in a tubular body including a plastic support ring having an annular groove in the outer periphery which is adapted to be inserted into an open end of a hollow can together with a rotating head which urges groove forming wheels against the can body to force the body into the ring groove to form a circumferential groove in the can body adjacent to one end thereof.

Another object of the present invention is to provide a machine which can groove 300–550 or more can bodies per minute during normal operation.

These and other objects and advantages will become apparent hereinafter.

The present invention comprises a machine for making a can wall having a circumferential, inwardly directed groove adjacent to one end and comprises a support means, drive means mounted on said support means, and a pair of timed rotatable heads adapted to receive a supply of hollow tubular bodies, carry the same through the machine, form a groove adjacent to one end thereof, and discharge the can bodies in a continuous stream from the machines.

The present invention comprises the method and apparatus hereinafter described and claimed.

In the drawings, wherein like numbers refer to like parts wherever they occur:

Figure 1:
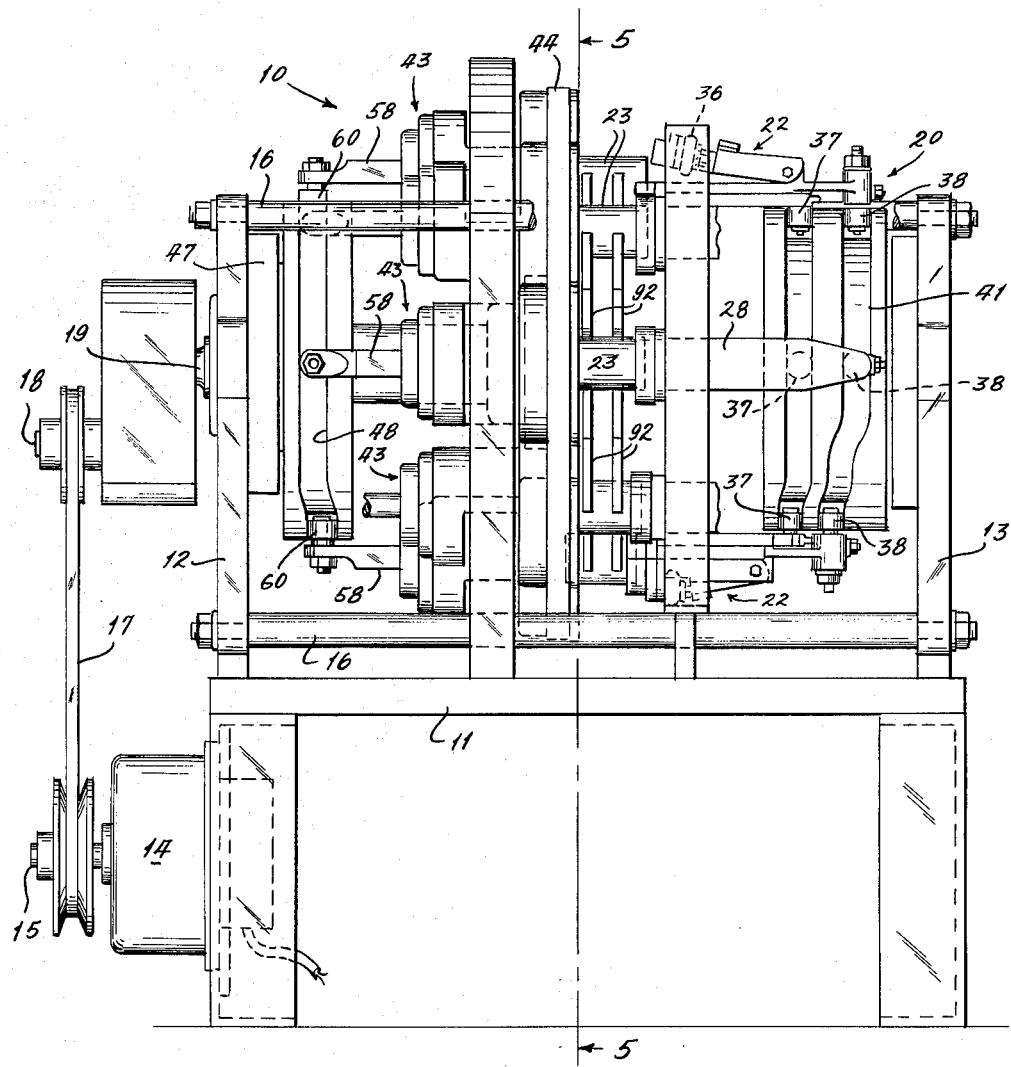
FIG. 1 is a side elevational view of the present invention.
Figure 2:
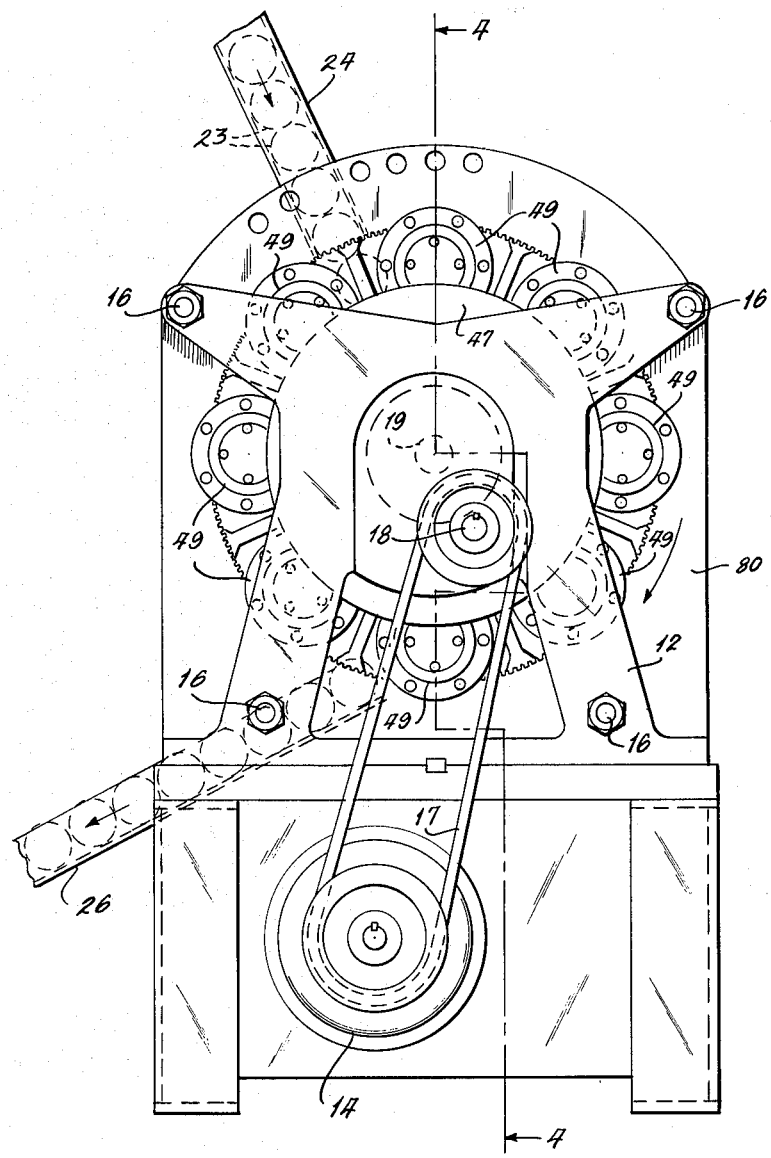
FIG. 2 is an end elevational view of the present invention.
Figure 3:
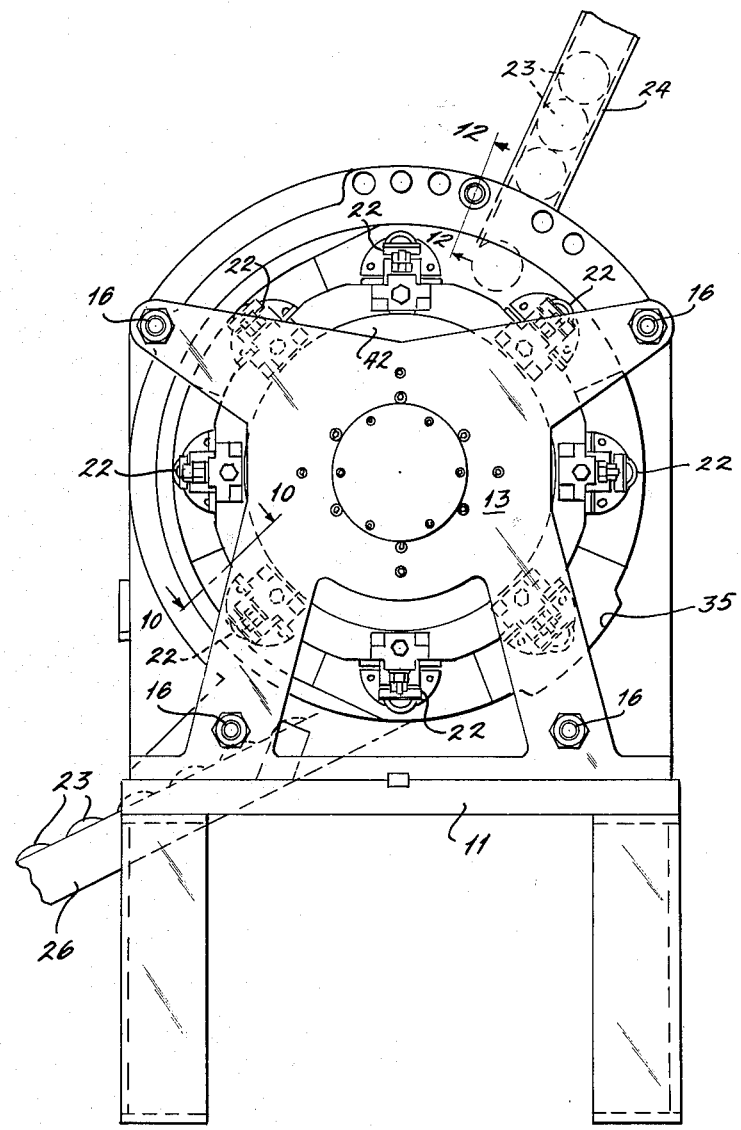
Figure 12:
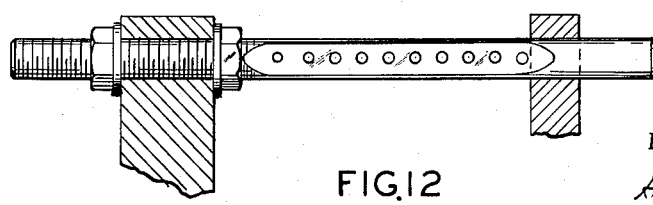
Figure 4:
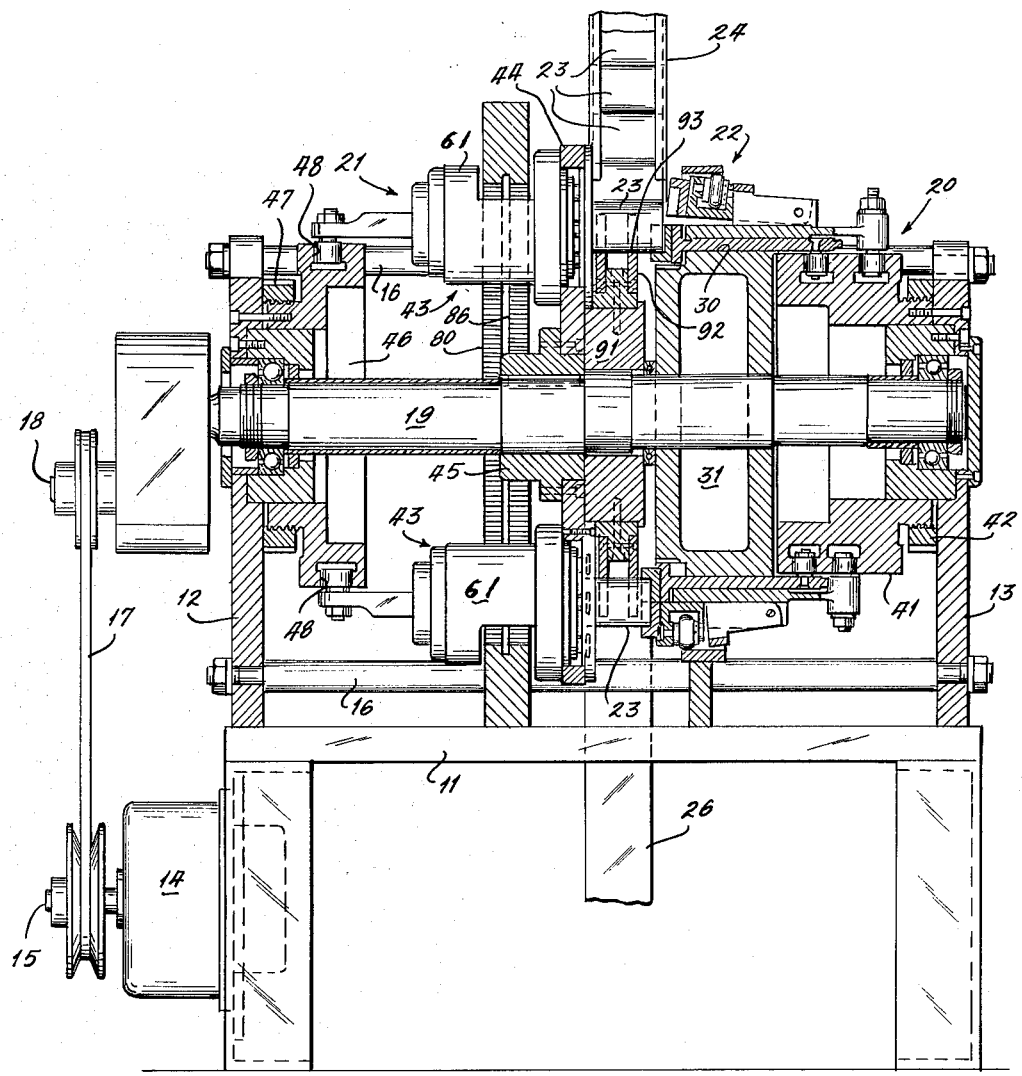
Figure 5:
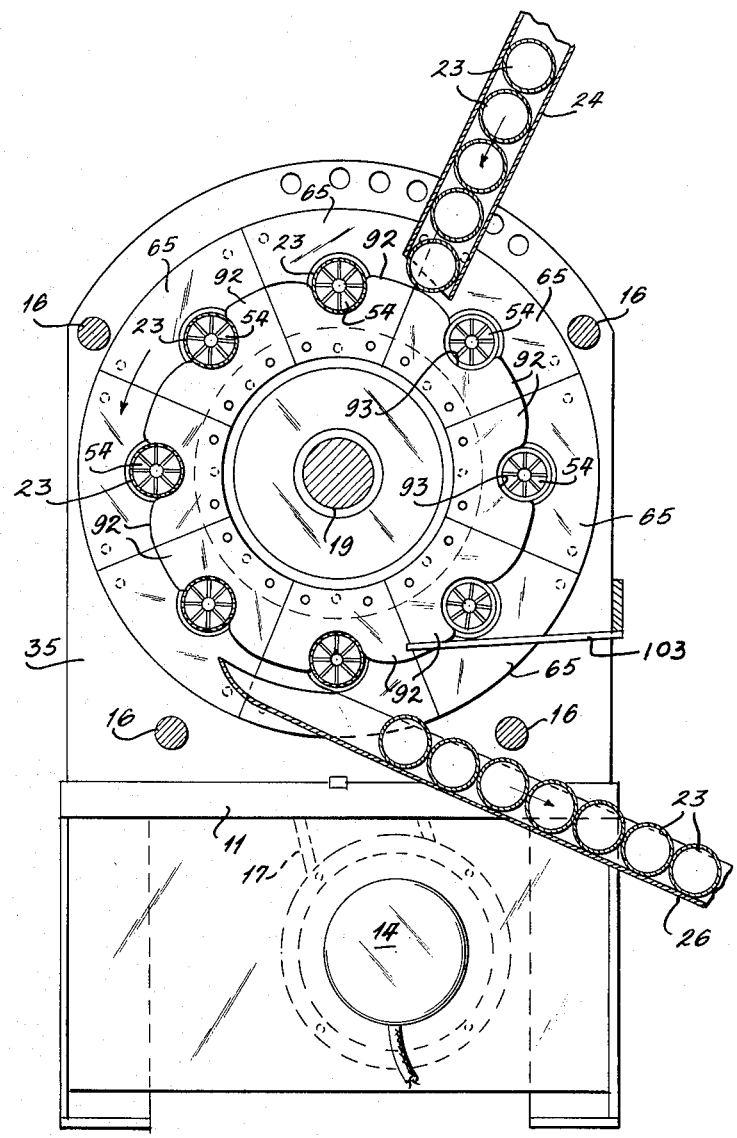
Figures 6, 8:
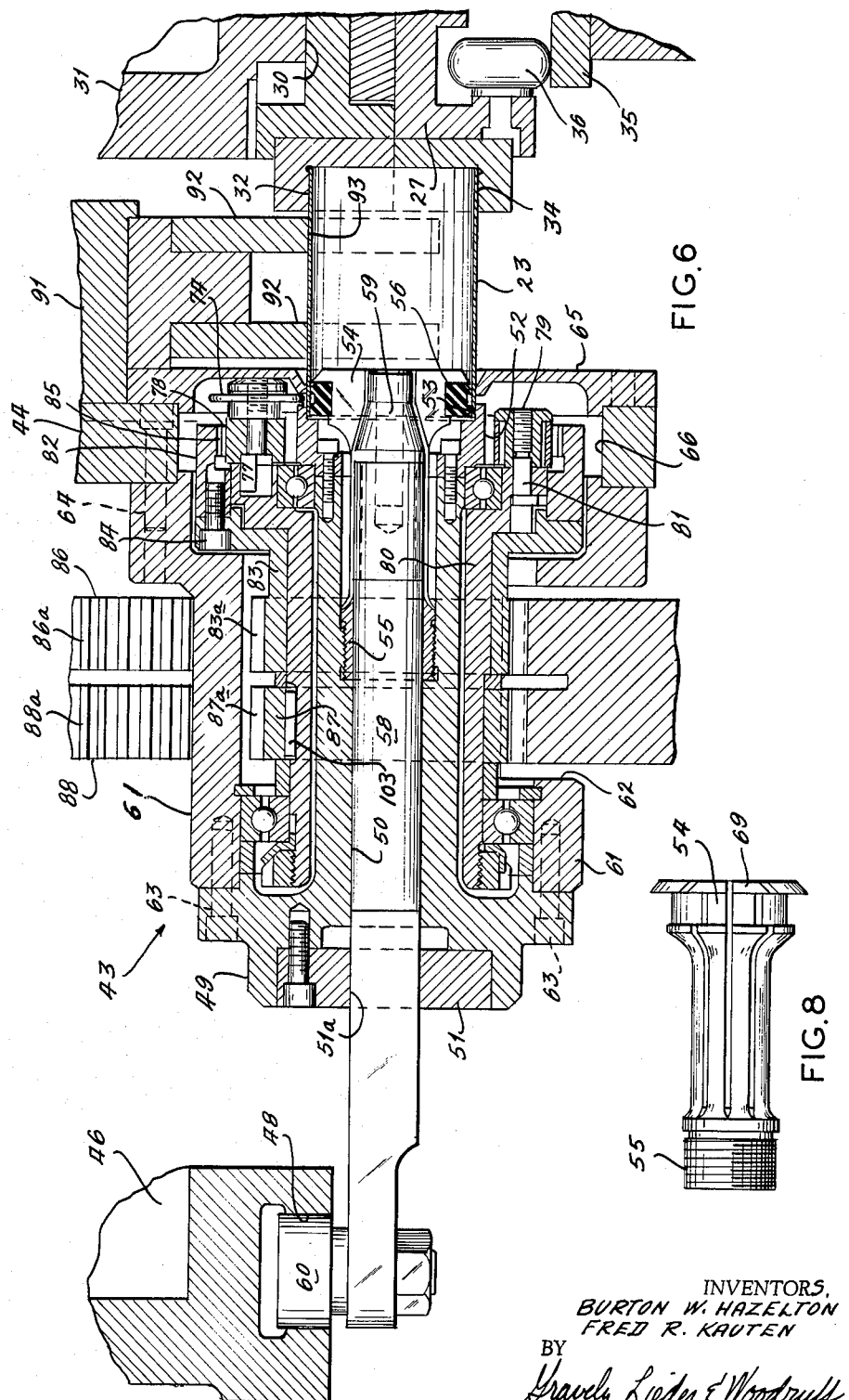
Figure 9:
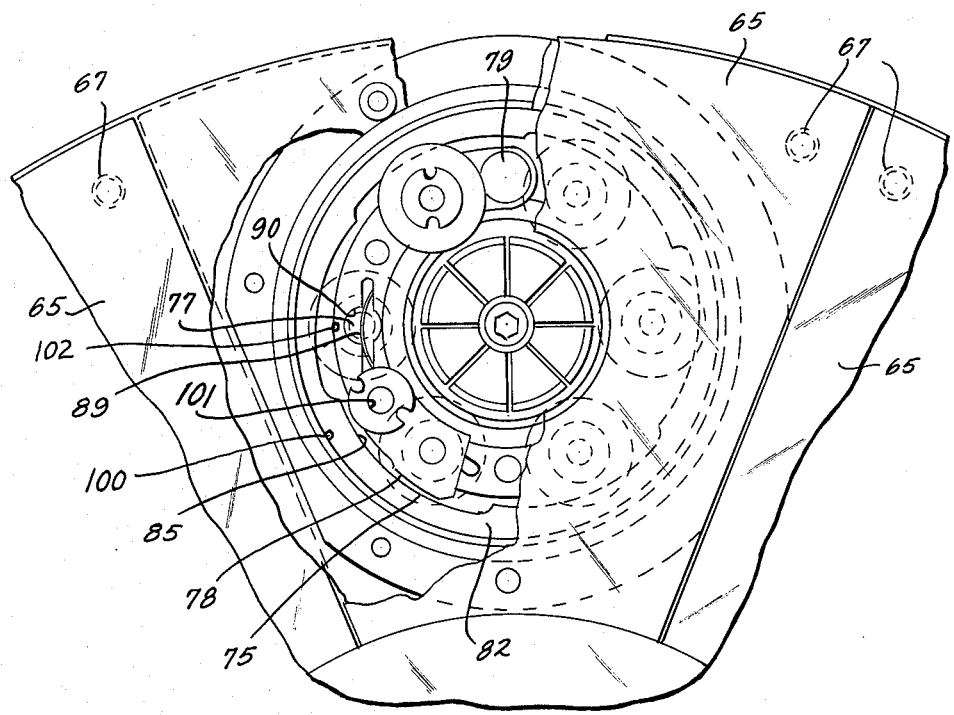
Figure 13:
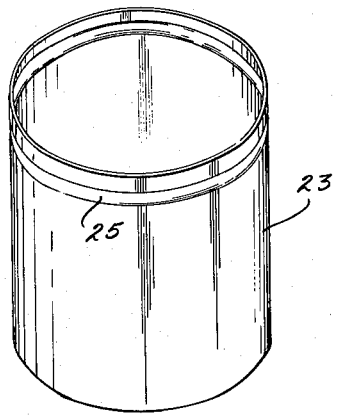
Figure 14:
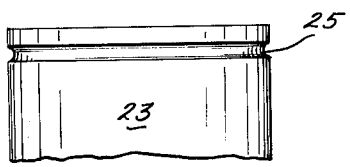

FIG. 3 is an end elevational view taken from the end opposite that shown in FIG. 2, FIG. 4 is a side view similar to FIG. 1 but partly in section, FIG. 5 is a sectional view taken along line 5—5 of FIG. 1, FIG. 6 is an enlarged fragmentary view partly in section showing the groove forming mechanism, FIG. 7 is an enlarged fragmentary view partly in section showing a can positioned in the forming head with the groove having been formed therein, FIG. 8 is a side elevational view of the collet on which the back-up ring is mounted, FIG. 9 is a fragmentary view showing more details of the groove forming dies, FIG. 10 is an enlarged fragmentary view partly in section showing one of the can gripping jaw mechanisms, FIG. 11 is a view taken along line 11—11 of FIG. 10, FIG. 12 is a fragmentary view partly in section taken along line 12—12 of FIG. 13, FIG. 13 is a perspective view of a can having a groove formed therein by the present mechanism, FIG. 14 is a fragmentary side view showing more details of the groove formed in a can body, and FIG. 15 is a fragmentary view partly in section of a modification of the grooving mechanism.

Overall construction

The groove forming machine 10 shown in FIG. 1 comprises a base or support 11 on which are mounted two upright support members 12 and 13 at opposite ends thereof. A motor or drive means 14 having an output shaft 15 is mounted on the support 11. The upright members 12 and 13 are connected by a plurality of stringers or tie bolts 16 which are threaded on their ends and provided with nuts so that they may be tightened, if desired. A belt and variable speed pulley 17 connects the motor output shaft 15 to a drive shaft 18 which is geared to rotate a main or center shaft 19 rotatably journaled in the upright support members 12 and 13 (FIG. 4). Two timed rotating heads 20 and 21 are mounted on the main shaft 19 and rotate therewith. The first or can body positioning head 20 is provided with eight pairs of jaws 22 which receive the hollow open ended tubular can bodies 23 from an input chute 24 (FIG. 2), grasp the bodies 23, move the bodies 23 forward toward the second or can grooving head 21, retract the bodies 23 after a circumferential inwardly directed groove 25 (FIGS. 13 and 14) is formed therein by the second head 21, and discharge the can bodies 23 to a discharge chute 26 (FIG. 2).

Can body positioning head

Each of the can gripping jaw pairs 22 comprises a two-part pivoted outer jaw support or slide mechanism 27 and 27a and an inner jaw support or slide mechanism 28. The outer jaw support is formed in two parts 27 and 27a which are urged apart by a spring 29 positioned therebetween (FIG. 10). The inner jaw support member 28 is adapted to slide longitudinally along the outer surface 30 of the hollow body portion 31 of the head 20 and has a semi-cylindrical cup or jaw 32 in its forward end for receiving a can body 23. The outer jaw support members 27 and 27a are pivoted at their rear end 33 and the jaw support member 27 also is provided with a semi-cylindrical cup or jaw 34 at its forward end for receiving a can body 23. The jaws 32 and 34 cooperate to grasp a can 23 therebetween. The outer jaw support member 27a lies adjacent to the outer surface of the inner jaw support 28. The spring 29 normally urges the outer jaw support member 27 outwardly, and the jaw supports 27 and 28 are closed on a can body 23 by the action of a fixed cam 35 against which a cam follower roller 36 mounted in the outermost jaw support member 27 moves. The cam 35 is mounted on the base 11 and as the can positioning head 20 is rotated, the cam followed 36 rolls against the fixed cam 35 and closes the outer jaw 34 against a can body 23.

The inner jaw support 28 and outer jaw support member 27a have cam follower rollers 37 and 38, respectively, mounted on their rear ends and positioned in cam slots 39 and 40 formed in the outer surface of a body 41 which is fixed to the base 11 by being threaded to a boss 42 mounted on the upright member 13 (FIG. 4). As the can positioning head 20 rotates, the cam rollers 37 and 38 move in the cam slots 39 and 40 to urge the can body 23 toward and away from the second or can grooving head 21. This movement is timed, and the cam slots 39 and 40 are so shaped that this action occurs after the fixed circular cam 35 has urged the outer jaw support 27 toward the inner jaw support 28 to grasp the can body 23 therebetween. The longitudinal movement of the jaw supports 27 and 28 toward the can grooving head 21, positions the can 23 in the head 21 while it is grooved, and thereafter retracts the can 23 so that the spring 29 separates the jaws 32 and 34 to release the can 23, after the groove 25 is formed therein by the grooving head 21.

Can grooving head

The second or can groove forming head 21 comprises eight can grooving fixtures 43 mounted on a face or head plate 44 which is fixed to a hub 45 which is keyed to the main shaft 19 and rotates therewith (FIG. 4). A cam housing 46 is threaded to a boss 47 fixed on the upright 12 and is provided with a mandrel extracting cam groove 48 in the outer periphery thereof. Each of the groove forming fixtures 43 (FIG. 1) comprises a main supporting stem member or arbor 49 which has a throughbore 50 therein, a ram slide guide 51 (having a rectangular opening 51a therein) fixed to the arbor 49, and a front retainer 52 provided with a counterbore 53 fixed to the main member 49. A split collet 54 (FIG. 8) is threaded to the inside of the arbor 49 at 55 and is provided at its leading end with a plastic inner support ring 56 having a groove 57 in its outer periphery. A movable mandrel 58 having a tapered end 59 is slidably positioned within the collet 54 and is moved therethrough by means of a roller cam follower 60 positioned in the cam slot 48 and fastened to the rear end of the mandrel 58. As the cam follower 60 moves in the slot 48, the mandrel 58 moves into and out of the collet 54 to expand the collet 54 and the support ring 56. The cam slot 48 is so shaped that the mandrel 58 expands the collet 54 when the groove 25 is being put into the can 23, and extracts the mandrel 58 after the groove 25 is formed, before the can 23 is extracted from the head 21.

The supporting ring 56 is an essentially incompressible material, but has some resiliency and can be placed under tension to be made stiff when the collet 54 is expanded against it by the mandrel 58. The ring 56 preferably is of a urethane material of about 90 durometer.

A hollow outer housing 61 having a side opening 62 (for a purpose to be explained hereinafter) therein is secured to the arbor 49 by screws 63. The head plate 44 is secured to the outer housing 61 by the screws 64. A front housing cover 65 is positioned over the opening 66 in the front plate 44 and is secured to the front plate 44 by the screws 67 (FIG. 9).

The front housing cover 65 is provided with a tapered guide opening 68 to guide a can body 23 into the fixture 43 for grooving. The leading edge 69 of the collet 54 is oppositely tapered to lead in any out of round cans 23.

The leading edge of the can body 23 fits between the outer surface of the ring 56, and a shoulder 70 adjacent to the tapered opening 68 and an inwardly spaced shoulder 71 on the retainer member 52 fixed to the arbor 49. The end of the can 23 is spaced from an internal shoulder 73 on the retainer member 52 to provide clearance for proper operation of the grooving step. The location of the groove 25 with respect to the end of the can 23 is determined by the location of the gripping head 20 with respect to the grooving head 21. The ring groove 57 is positioned adjacent to and slightly spaced from one end of the can body 23. The mandrel 58 is moved into the collet 54 to force the ring 56 tightly against the inner surface of the can body 23 to provide support therefor during the grooving operation.

Grooving mechanism

The actual grooving mechanism comprises a series of rotatable grooving wheels 74 (six per grooving fixture 43). Each rotatable grooving wheel 74 is mounted at one end of a lever cam 75 by a pin 76 having a half head 77. The lever cam 75 has a cam lobe 78 on its outer surface adjacent to the wheel 74 for moving the grooving wheel 74 toward the can body 23 to form the groove 25 therein. The lever cam 75 is pivotally mounted at its other end 79 to a rotatably driven cage 80 by a headed pin 81, which also is the pin about which the lever cam 75 pivots at 79.

An outer cam ring 82 is secured to a driven flange gear 83 by screws 84 and rotates therewith. Six equally spaced cam lobes 85 protrude from the inner surface of the cam ring 82 and engage the cam lobes 78 on the cam levers 75 to bias the grooving wheels 74 into the surface of the can 23 to form a groove 25 therein. The flange gear 83 has 36 gear teeth 83a adapted to mesh with a drive gear 86 fixed to the base 11. The internal drive gear 86 has 210 gear teeth 86a thereon.

A spur gear 87 is keyed to the cage 80 which, through its connection to the lever cams 75, forms a rotatable inner cam ring carrying the grooving wheels 74. The spur gear 87 has 35 teeth 87a which mesh with a drive gear 88 having 210 teeth 88a. As the main shaft 19 is rotated, the gears 86 and 88 drive the flange gear 83 and the cage 80, respectively, with respect to the arbor 49. The flange gear 83 rotates the outer cam ring 82 with respect to the can 23; and the inner cam ring on the front face of the cage 80, including the lever cams 75 and the grooving wheels 74, also are rotated with respect to the can 23. As the flange gear 83 has 36 teeth, and the spur gear 87 has 35 teeth, the outer cam ring 82 rotates slightly slower than the inner cam ring, so that the engagement of the relatively moving cam surfaces 78 and 85 on the lever cams 75 and the outer cam ring 82 respectively, urge the grooving wheels 74 toward the can 23 to form the groove 25 therein. Each of the grooving wheels 74 is spring loaded by a spring 89 mounted in an elongated slot 90 in the front flange of the cage 80 (FIG. 9) which biases the grooving wheel 74 outwardly away from the can 23, and returns the wheel 74 to its outward position when the can 23 is grooved. The spring 89 acts against the pin head 77, which moves through the slot 90 to permit the movement of the wheel 74 toward and away from the can 23. The gears 86 and 88 engage the cage 80 and the spur gear 87 through the opening 62 in the outer housing 61. Thus, the grooving wheels 74 are rotated with respect to the can 23, through the action of the cage 80 and the flange gear 83, and also are rotatably mounted on the lever cams 75 to form a smooth groove 25 in the can 23. Each of the fixtures 43 is carried in a 360° arc during a can grooving operation and the internal moving parts of the fixtures 43, i.e., the cage 80, the flange gear 83, the wheels 74, etc., are themselves being continuously rotated 360° with respect to the can 23 by the gears 86 and 88.

A can supporting structure comprising a star wheel hub 91 mounted on the main shaft 19 and rotatable therewith, and upwardly extending spaced star wheel segments 92 having curved can supporting surfaces 93, is positioned between the can positioning head 20 and the can grooving head 21 (FIG. 4).

FIG. 15 shows a modified grooving roller 74a having a back-up ring 74b fixed behind the grooving edge of the roller 74a. The ring 74b supports the outer edge of the can 23 during grooving, preventing its curling upwardly. The retainer 52a is modified to remove the support shoulder 71. The function of the shoulder 71 is taken over by the back-up roller 74b.

*Timing*

The timing of the can grooving head 21 is important so that the grooving wheels 74 are engaged with the can body 23 to form the groove 25 therein. To properly assemble the head 21, a timing mark 100 is placed on the cam ring 82 coincident with the centerline of any one of the mounting holes 101 which lies on the center line of a tooth 83a of the flange gear 83. A second timing mark 102 on the cage 80 is positioned on the same center line as that of the key 103 which holds the spur gear 87 to the cage 80, and on the centerline of a slot 90. The keyway in the gear 87 is on the centerline of one of the teeth 87a. In assembly, these two marks 100 and 102 must be coincident, placing the teeth 83a and 87a in line. With this alignment maintained, the parts are positioned in the gears 86 and 88 with the aligned marks 100 and 102 positioned in the space between the 27th and 28th teeth 86a and 88a counting in the direction of rotation of the head 21. The gears 86 and 88 are constructed so that a space between the teeth 86a and 88a is on the vertical centerline.

*Operation*

As a can 23 is fed into the machine 10 from the can chute 24, it is positioned with respect to the machine 10 as shown by the uppermost can in FIG. 4. The can rests on the cup 32 in the inner jaw support 28 and the center can supporting star wheel segments 93. As the two heads 20 and 21 are rotated by the motor 14, the jaw supports 27 and 28 are closed by the cam 35 to grasp the can 23 therebetween, and the jaw supports 27 and 28 move toward the can grooving head 21 to position the can 23 in the can grooving head 21 with the support ring 56 within the end of the can 23, and the grooving wheels 74 in inactive position. The mandrel 58 then is moved forward into the collet 54 to expand the collet 54 and position the support ring 56 tightly against the inner surface of the can 23. Now the groove forming wheels 74 are urged against the outer surface of the can 23 by the action of the cam follower lobes 78 on the lever cams 75 engaging the cam surfaces 85 of the outer cam ring 82. As the inner cams 78 move with respect to the outer cams 85 because of the different number of gear teeth 83a and 87a on the gears 83 and 87, the groove forming wheels 74 are rotated around and into the can body 23 to form a groove 25 therein. After the groove 25 has been formed in the can 23, the cam follower lobes 78 drop away from the cams 85, and the spring 89 urge the grooving wheels 74 to their inactive position away from the can body 23. The mandel 58 then is retracted by the action of the cam slot 48 on the cam follower 60, the cams 39 and 40 move the can 23 from the groove forming head 21, and the upper jaw support 27 rides free of the cam 35 so that the spring 29 raises the jaw support 27. The jaw support 27 then is further retracted by the cam 40 to free the grooved can 23, which falls by gravity or by the action of a bifurcated stabilizer support 103 into the second or discharge chute 26 as the head 20 continues to rotate.

This invention is intended to cover all changes and modifications of the examples of the invention herein chosen for purposes of the disclosure, which do not constitute departures from the spirit and scope of the invention.

What is claimed is:

1. A machine for making can bodies having a circumferential inwardly directed groove adjacent to one end comprising
   (a) support means,
   (b) drive means, and
   (c) a pair of timed heads rotated by the drive means and mounted on the support means,
   (d) one of the timed heads comprising means for receiving a hollow open ended tubular can body, means for grasping the body, means for urging the body toward the second head, means for retracting the body, and means for releasing the body as the first head is rotated,
   (e) the second of the heads comprising means for receiving one end of the can body, means for forming an inwardly directed circumferential groove in the can body adjacent to the end as the head is rotated, and an annular essentially incompressible internal support member for internally supporting the can body during grooving, said member having a peripheral groove into which the can wall is moved during grooving.

2. The structure of claim 1 wherein the annular grooved member is mounted on an expansible collet and including a controlled mandrel movable through the collet to expand the collet and the member against the internal surface of the can during grooving.

3. The structure of claim 2 including a fixed cam mounted on the support means and a cam follower attached to the mandrel, the cam being constructed and arranged to move the mandrel into and out of the collet as the second head is rotated.

4. The structure of claim 1 wherein the pair of independent cams are constructed and arranged to move the outer jaw independently of the inner jaw when the jaws are open and in concert with the inner jaw when the jaws are closed.

5. A machine for making can bodies having a circumferential inwardly directed groove adjacent to one end comprising
   (a) support means,
   (b) drive means, and
   (c) a pair of timed heads mounted on a common shaft positioned on the support means and rotated by the drive means,
   (d) one of the timed heads being a can positioning head and comprising means for receiving a hollow open ended tubular can body, means for grasping the body, means for urging the body toward the second head, means for retracting the body, and means for releasing the body as the first head is rotated,
   (e) the second of the heads being a can grooving head and comprising
      (1) means for receiving one end of the can body,
      (2) means for forming an inwardly directed circumferential groove in the can body adjacent to the end as the head is rotated,
      (3) means for internally supporting the can body including an annular essentially incompressible member having a peripheral groove into which the can wall is moved during grooving,
      (4) an expansible collet on which the grooved member is positioned,
      (5) a controlled mandrel movable through the collet to expand the collet and the grooved member against the internal surface of the can during grooving, (6) a fixed cam mounted on the support means and a cam follower attached to the mandrel, the cam being constructed and arranged to move the mandrel into and out of the collet as the second head is rotated, (7) the said grooving means including (a) a first cam member, (b) a plurality of groove forming wheels rotatably mounted on arms pivotally mounted on a first cam member, said wheels being in juxtaposition with respect to the support member groove, (c) means positioned on the first cam member urging the wheels into an inactive position away from the can body, (d) a second cam member concentric with the first cam member, said cams being rotatable with respect to the cam body but at different speeds, the relative rotation of the cam members moving the can grooving heels into the outer surface can body to form a groove therein, (e) drive gear means fixedly mounted on the support means and (f) gear means mounted on the cam members and meshed with the drive gear so that the cam members are rotated with respect to the can as the groove forming head rotates, the cam gears having different numbers of teeth so that the cams also are rotated with respect to each other.

6. The structure of claim 5 wherein the can positioning head includes (1) a rotatable body having movable inner and outer jaws positioned around its periphery, (2) resilient means interposed between the jaws urging the jaws apart, said jaws having cooperating can receiving portions on their leading ends, (3) fixed cam means mounted on the support means, (4) cam follower means positioned on the outer jaw engageable with the fixed cam means as the head is rotated to open and close the outer jaw, (5) a pair of independent fixed cam means mounted on the support means, (6) cam followers fastened to the trailing edges of the jaws and operated by the independent cam means to move the jaws toward and away from the second head, (7) the pair of independent cams being constructed and arranged to move the outer jaw independently of the inner jaw when the jaws are open and in concert with the inner jaw when the jaws are closed.

7. A method of forming an inwardly directed circumferential groove in a tubular can body open at at least one end including the steps of positioning a hollow tubular can body so as to be in a position to receive an internal support member, positioning an expansible plastic ring having a peripheral groove in its outer surface within the open end of the can body adjacent to that end, expanding the ring tightly against the internal surface of the can body, rolling the can body into the ring groove to form an inwardly directed circumferential groove in the can adjacent to one end, contracting the ring to free the ring from the can, and withdrawing the ring from the can body.

8. A machine for making can bodies having a circumferential inwardly directed groove adjacent to one end comprising (a) support means, (b) drive means, and (c) a pair of timed heads rotated by the drive means and mounted on the support means, (d) one of the timed heads comprising means for receiving a hollow open ended tubular can body, means for grasping the body, means for urging the body toward the second head, means for retracting the body, and means for releasing the body as the first head is rotated, (e) the second of the heads comprising means for receiving one end of the can body and means for forming an inwardly directed circumferential groove in the can body adjacent to the end as the head is rotated, (f) the grooving means including a plurality of groove forming wheels rotatably mounted on pivoted arms, means urging the wheels into an inactive position away from the can body, and relatively movable cam members for moving the wheels gradually into the can body to form a peripheral groove therein, the wheels being mounted on one of the relatively movable cam members and the second cam member being concentric with the first cam member, and means for rotating the cam members at different speeds with respect to the can body.

9. A machine for making can bodies having a circumferential inwardly directed groove adjacent to one end comprising (a) support means, (b) drive means, and (c) a pair of timed heads rotated by the drive means and mounted on the support means, (d) the first head including a rotatable head having movable inner and outer jaws positioned around its periphery, resilient means interposed between the jaws urging the jaws apart, said jaws having cooperating can receiving portions on their leading ends, fixed cam means mounted on the support means, cam follower means positioned on the outer jaw engageable with the fixed cam means as the head is rotated to open and close the outer jaw, a pair of independent fixed cam means mounted on the support means, cam followers fastened to the trailing edges of the jaws and operated by the independent cam means to move the jaws toward and away from the second head, (e) the second of the heads comprising means for receiving one end of the can body and means for forming an inwardly directed circumferential groove in the can body adjacent to the end as the head is rotated.

References Cited by the Examiner

UNITED STATES PATENTS

| | | | |
|---|---|---|---|
| 1,644,823 | 10/1927 | Fay | 72—367 |
| 1,689,605 | 10/1928 | Walter | 72—370 |
| 3,033,264 | 5/1962 | Henrickson | 72—370 |
| 3,122,830 | 3/1964 | Dawson | 72—367 |

CHARLES W. LANHAM, *Primary Examiner.*

H. D. HOINKES, *Assistant Examiner.*